United States Patent [19]

Rappen

[11] Patent Number: 4,838,409
[45] Date of Patent: Jun. 13, 1989

[54] SCRAPER DEVICE FOR CONVEYOR BELTS

[75] Inventor: Albert Rappen, Mülheim/Ruhr, Fed. Rep. of Germany

[73] Assignee: VSR Engineering GmbH Fordertechnik, Fed. Rep. of Germany

[21] Appl. No.: 20,590

[22] Filed: Mar. 2, 1987

[30] Foreign Application Priority Data

Mar. 12, 1986 [DE] Fed. Rep. of Germany ....... 3608193

[51] Int. Cl.⁴ .............................................. B65G 45/00
[52] U.S. Cl. ................... 198/497; 403/235; 198/499
[58] Field of Search ...................... 198/497, 498, 499; 15/256.5, 256.51; 403/235, 237, 233

[56] References Cited

U.S. PATENT DOCUMENTS

| | | | |
|---|---|---|---|
| 2,069,474 | 2/1937 | Erikson | 403/235 X |
| 2,191,366 | 2/1940 | Buccicone et al. | 15/256.51 |
| 2,941,855 | 6/1960 | Weill | 403/237 |
| 3,444,790 | 5/1969 | Rumsey | 403/237 X |
| 3,559,228 | 2/1971 | De Noyer | 15/256.51 |
| 3,631,968 | 1/1972 | Ward | 198/497 |
| 4,131,194 | 12/1978 | Andersson | 198/497 |
| 4,249,650 | 2/1981 | Stahura | 198/499 |
| 4,349,934 | 9/1982 | Margittai | 15/256.51 |
| 4,359,150 | 11/1982 | Bowman et al. | 15/256.5 X |
| 4,489,823 | 12/1984 | Gordon | 198/499 |
| 4,533,035 | 8/1985 | Reiter | 198/499 |
| 4,598,823 | 7/1986 | Swiderman | 198/497 |
| 4,664,250 | 5/1987 | Jakobs | 198/499 |
| 4,694,952 | 9/1987 | Meijer | 198/499 |

FOREIGN PATENT DOCUMENTS

| | | | |
|---|---|---|---|
| 599200 | 6/1958 | Canada | 15/256.51 |
| 826420 | 1/1952 | Fed. Rep. of Germany | 198/499 |
| 2081662 | 2/1982 | United Kingdom | 198/498 |

Primary Examiner—Robert J. Spar
Assistant Examiner—Cheryl L. Gastineau
Attorney, Agent, or Firm—McGlew & Tuttle

[57] ABSTRACT

A scraper device to clean conveyor belts includes a bearing axle located below the conveyor belt for a blade holder having spring arms which can be mounted on the axle. The holder carries scraper blades at the end which in a preset angle of pitch are pressed against the conveyor belt. The spring arms comprise parallel guide rods of resilient material. The arms support the blade in a vertical position pressed against the lower segment of the belt. The angle of pitch is, in an advancing position of the scraper blades, maximally up to 10°. In this way, with minimal wear and tear, optimum cleaning effects are achieved which, at the same time, show careful treatment of the belts.

4 Claims, 3 Drawing Sheets

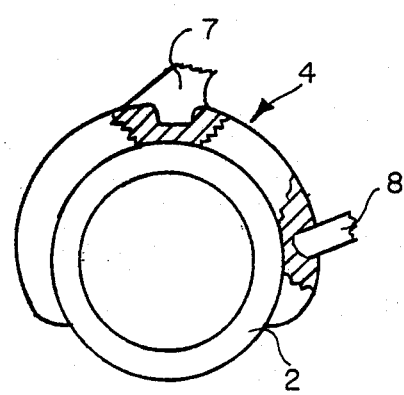
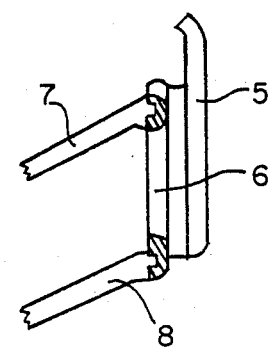

SCRAPER DEVICE FOR CONVEYOR BELTS

FIELD AND BACKGROUND OF THE INVENTION

This invention relates in general to conveyors and in particular to a new and useful scraper device particularly for conveyors used in mining minerals.

The invention particularly concerns a scraper device to clean conveyor belts especially shuttle belt conveyors with a bearing axle placed below the conveyor belt over its width to provide mounting possibilities for spring arms with a mounting device on one end to connect to the bearing axle and scraper blade holders for scraper blades at the other end which are pressed against the lower segment of the conveyor belt.

Scraper devices for cleaning conveyor belts are known in which the rigidly fastened scraper blades fitted to the ends of the spring arms are pressed in an advancing position against the lower segment of the forward moving conveyor belt. Advancing positions with scraper blades that rotate elastically backward and downward and have a rotational axis essentially below the scraper edge is problematic. This is especially because, as a consequence of differing frictional and stripping forces through belt velocity, surface roughness or material sticking or through large material amounts, a socalled stick-slip effect between scraper blade and belt surface occurs resulting in chatter marks and finally belt damage. To avoid these disadvantages and to achieve cleaning with the least amount of damage to the belt, a trailing position for the scraper blades is preferred which rotate with a spring arms to which they are fastened around a rotational axis. With shuttle belt conveyors this trailing position becomes, however, an advancing position with the mentioned disadvantages when the conveyor belt runs in the reverse direction, that is backward, if there is not an additional joint which allows for the return flip of the scraper blade. A further disadvantage of the known scraper devices lies in the fact that the spring arms are regularly fashioned as torsion spring arms, i.e. torsion springs are placed on the mounting device for the bearing axle. In this respect it is a relatively complicated construction method which requires pre-assembly from individual structural units.

A scraper device, finally, is known in which the holder device, the spring arm and the stripping scraper blade consist of wear and tear resistant, elastic and homogeneous polyurethane. The elastic bending of the spring arm creates the pressing force for the scraper blade. A disadvantage of this construction is that it represents a comprise between the wear and tear and the scraping behavior of the spring effect which decreases because of permanent deformation. If the scraper blade is worn out, the entire scraper unit has to be replaced. All known scraper devices have the one disadvantage in common that the angle of pitch of the scraper blade changes continuously as a consequence of wear and tear and changing scraper contour lines and therefore optimum cleaning is never achieved.

SUMMARY OF THE INVENTION

The invention provides a scraper device for cleaning conveyor belts, especially shuttle belt conveyors, and which is marked by optimum cleaning ability as well as low scraper blade wear and tear and operates both with forward as well as backward running conveyor belts, and is an especially simple design with respect to manufacture, assembly and construction.

According to the invention, a scraper device has spring arms which are fashioned out of at least two parallel guide rods of resilient material, and layer scraper blades which extend over the entire travel stroke and are pressed against the lower segment essentially in vertical positopn, whereby the angle of pitch in respect to a forward motion of the scraper blades is up to 10° on the conveyor belt with respect to the perpendicular. These measures of the invention have as a consequence that on the basis because of the resilient spring arms the intermediate placement of otherwise required torsion springs can be dispensed with. Moreover, the elasticity of the spring arms can be easily adjusted so that the stripping scraper blades are essentially pressed perpendicularly against the conveyor belt, and, with the conveyor belt running in the reverse direction, the scraper blade can tilt into a trailong position because of the bending of the upper and lower chord of the parallel guiding rods. Optimum results can be achieved using a 150 mm wide scraper blade, a pressure of 50 to 150 N and a travel stroke of approximately 20 mm.

Thus, the invention teaches that the spring arms, the mounting devices and the scraper blade holders each form a homogeneous structural unit of high strength synthetic, if necessary with fiber reinforcements or spring steel reinforcement. The idea of the invention is also fulfilled if solely the mounting device and the scraper blade holder are fashioned of synthetic material and the parallel guide rods are of spring steel. The embodiment using synthetics is especially easy to produce since it can be produced by extrusion. Because of the precise production method by extrusion, the spring arms and the scraper blades can be arranged close beside each other and, thus, do not need to be staggered. A preferred embodiment of the invention with independent significance intends that the spring arms between mounting device and scraper blade holder are formed with an upper chord and with a lower chord running essentially parallel whereby the scraper blade holder adjoins the scraper blade in a vertical position. The upper and lower chord can each comprise at least two individual positions. This enbodiment ensures that even if conditions of high elasticity and other interfering influences are given through belt damage or wear and tear, the angle of pitch of the scraper blade against the lower segment of the conveyor belt is maintained. Constant blade angle with respect to the conveyor belt reduces the scraper blade wear and tear and increases the cleaning effect, Preferentially, the upper chord and the lower chord are of different lengths and/or elasticity so that under conditions of extreme stress, especially with the conveyor belt running in reverse direction, they deform differently and the scraper blade changes its angle of pitch with respect to the conveyor belt at most such that it glides off easier and is less inclined to get struck.

The mounting device can be fashioned as a vertical double crosspiece with transverse bores to hold mounting bolts and cotter pins. According to another embodiment, the invention recommends that the mounting device is fitted as a clamp enclosing the bearing axle at least partially with pegs, bores, ridges and/or grooves, whereby the pegs of the clamp fit into corresponding bores of the bearing axle respectively the ridges of the clamp into corresponding grooves of the bearing axle or vice versa. In the presence of ridges or grooves the spring arms and the scraper can be easily positioned on the bearing axle in the position required each time. The mounting device is preferentially fashioned as a resilient semiclamp with grooves, ridges, pegs and bores facing each other on the inside which then fit into corresponding longitudinal ridges, longitudinal grooves, bores or pegs of the bearing axle. The spring arm and/or the mounting device can furthermore, be fitted in areas subject to critical stress with reinforcement inlays of metal and/or attenuation zones in order to increase stability or resiliency. They can also consist entirely of preferentially resilient steel. The idea of the invention is also fulfilled if thesemiclamp encloses the axle over more than 180° and has only on one side grooves, bores, ridges or pegs. The invention further provides that the bearing axle is fashioned as a C section with a mounting slot facing downward and the mounting device has a locking device which fits from below into the mounting slot, for example, a clasp or a clamp holder which can be locked or loosened by turning. In this way, a perfect fit of the mounting clamp and, consequently, of the associated scraper on the bearing axle is acheived. The mounting device is also held on the axle if the pegs are thickened at the ends and the opposite side has slotted long hole with an enlargement corresponding to the thickening.

According to the invention, the scraper blade holders have an insert or attach grooves and the scraper blades a corresponding insert or attach springs and can, in this way, be inserted or attached to the scraper blade holders. By this means, the scraper blades can also easily be exchanged. In particular, the scraper blades have recesses shaped like a reverse U whereby the sides of the U form the insert or attach springs while the scraper blade holders have a 3 to 10 mm wide groove with an upper transverse edge so that the inserted, or attached, scraper blades can absorb vertical forces as well as fleural torque. In this connection the invention teaches that the scraper blade holders can have latches and the scraper blades rest indentations or vice versa and thereby the inserted respectively attached scraper blades can automatically be locked in position, thus, cannot fall out of the scraper blade holder. Basically, the scraper blades can be made of steel, hard metal, polyurethane or ceramics. The preferred embodiment of the invention provides for the scraper blades to be steel blades with a scraping edge of oxide ceramics because of the essentially vertical position against the lower segment or reach of the conveyor belt which could be obtained within the framework of the invention, an extremely slight degree of wear and tear and careful treatment in association with perfect cleaning effects would be achieved. In that the essential advantages of the invention lie.

Accordingly it is an object of the invention to provide a scraper device for a conveyor which has an upper and a lower reach and which comprises a bearing axle adapted to be supported below the lower reach with a blade holder which includes an intermediate resilient portion which has a hub portion at one end thereof which is engaged with the bearing axle and an opposite end with a blade holder which supports a blade so that it extends substantially vertical and is pressed against the lower reach at an angle of no more than 10° and which intermediate resilient portion of the holder comprises spaced aparat substantially parallel rods of resilient material.

A further object of the invention is to provide a scraper device for conveyors which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIGS. 8 and 9 are partial side elevational and partial broken-away sectional views going the upper and lower cords which are formed by spring steel rods with a portion embedded in the material of the mounting device and an opposite end portion embedded in the material of the scraper blade.

GENERAL DESCRIPTION OF THE PREFERRED EMBODIMENTS

Figure 1:
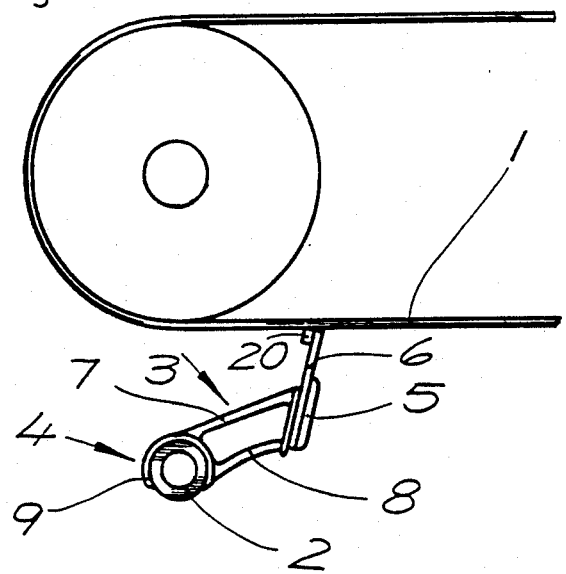
FIG. 1 is a schematic side view of a scraper device for a conveyor with guide drum and conveyor belt constructed in accordance with the invention.
Figure 2:
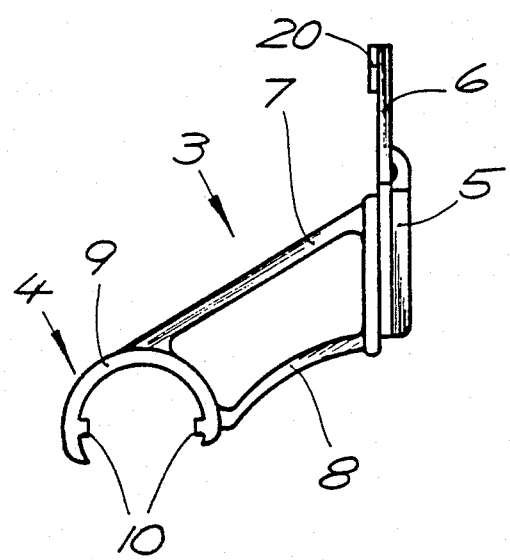
FIG. 2 is an enlarged side elevational view of a scraper according to FIG. 1.

Referring to the drawings in particular the invention embodied therein comprises a scraper device for a conveyor generally designated 1 which has an upper reach and a lower reach. In accordance with the invention a bearing axle 2 is disposed below the lower reach of the conveyor and it supports a blade holder which has an intermediate resilient portion comprising a pair of substantially parallel upper and lower chords 7 and 8 in the form of spring arms or rods 3. A hub portion or mounting device 4 is carried on said holder adjacent one end of said resilient portion and is engageable on said bearing axle 2. Blade holder 5 is arranged adjacent the opposite end of said resilient portion 3 and a blade 6 is engaged in the holder portion 5 and is positioned in a substantially vertically extending orientation. The blade 6 is held against said lower reach at an angle of no more than 10° from the vertical or from a perpendicular to the lower reach of the conveyor 1. The resilient portion 3 advantageously comprises spaced substantially parallel rods of resilient material.

The figures show a scraper device to clean conveyor belts, especially shuttle belt conveyors with a bearing axle 2 placed below the associated conveyor belt 1 over the entire width of the belt for mounting flexible supports or spring arms 3 on it with a mounting device or engagement hub 4 on one end which connects to the bearing axle 2 and scraper blade holders 5 on the other end for a scraper blade or blades 6. The blade is disposed at a preset angle of pitch and it is pressed against the lower segment or reach of the conveyor belt 1. The spring arms 3 are of resilient material and are pressed vertically against the lower segment of the belt. The angle of pitch in the advancing position of the scraper blade 6 is at most up to 10°. The spring arms 3, the mounting devices 4 and the scraper blade holders 5 form each a homogeneous structural unit of, for instance, a synthetic material or spring steel. The spring arms 3 between the mounting device 4 and the scraper blade holder 5 are each formed by an upper chord 7 and a lower chord 8 running substantially parallel to the upper chord and the scraper blade holder 5 supports the associated scraper blade 6 in vertical position. Upper chord 7 and lower chord 8 are of differing lengths and can also differ with respect to elasticity and cross section. In the embodiment shown, the lower chord 8 is shorter than the upper chord 7. According to a modified embodiment, the upper chord 7 and the lower chord 8 can each comprise either single or multiple spring steel rods or such spring steel rods can be embedded in a chord material or cast in the synthetic material.

The mounting device 4 advantageously comprises vertical double crosspiece with transverse bores to hold mounting bolts (not shown). Represented, is however, an embodiment according to which the mounting device 4 is fitted as a clamp which at least partially encloses the bearing axle 2 and has, e.g. pegs, bores, ridges, etc. 10 and/or grooves which fit into corresponding longitudinal grooves 11 or bores. The mounting device 4 is preferentially, a semicircular hub 9 with projections 10 or pegs lying opposite to each other on the inside which fit into corresponding longitudinal grooves 11 or bores of the bearing axle 2. The spring arm 3 and/or the mounting device 4, in areas subject to critical stress reinforcement, are provided with inlays of metal and/or indicated attenuation zones 12 to increase stability and/or resiliency. The bearing axle 2 is fashioned as a C-section tube with a mounting slot 13 pointing downward. The mounting device 4 has a locking device 14 which reaches into the mounting slot 13 from below, for instance, a clasp or a clamp handle which can, by turning, be loosened or locked.

Figure 3:
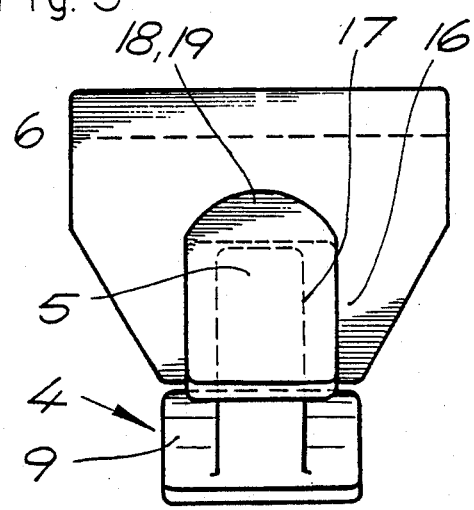
FIG. 3 is a front elevational view of the scraper shown in FIG. 2.
Figure 4:
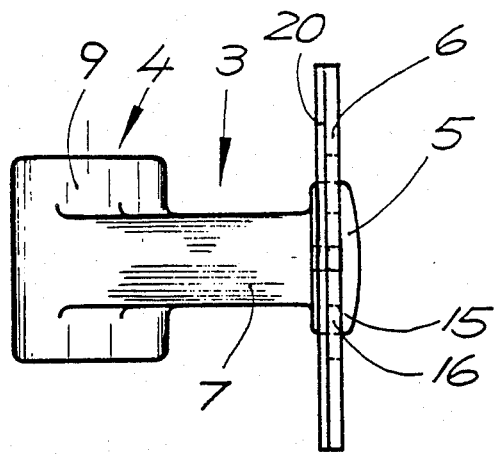
FIG. 4 is a top plan view of the scraper shown in FIG. 2.
Figure 5:
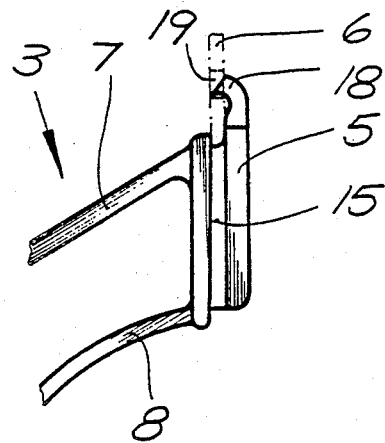
FIG. 5 is an enlarged partial sectional view of the scraper blade holder for the scraper shown in FIG. 2.
Figure 6:
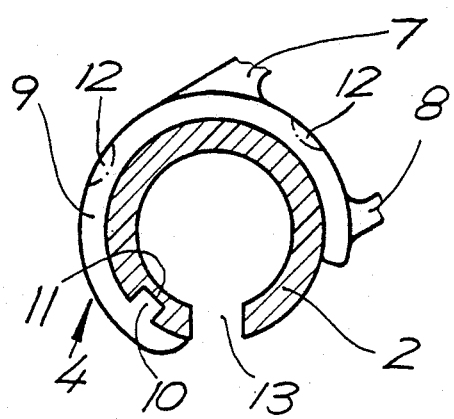
FIGS. 6 and 7 are views of a mounting device for the scraper.
Figure 7:
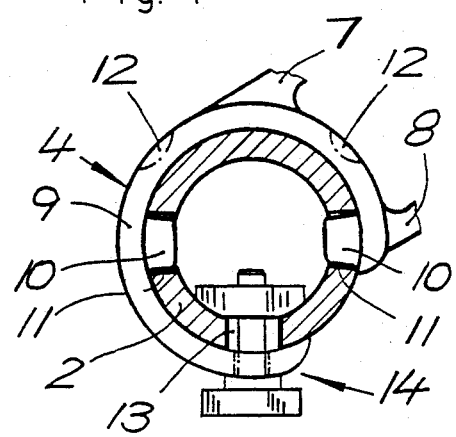

The scraper blade holder 5 has attachment grooves 15 for the scraper blades 6 and the blades have corresponding inserts or springs 16 whereby a connection between scraper blade holder 5 and scraper blade 6 is achieved. The represented embodiment in FIG. 3 includes a scraper blade 6 with a reverse U-shaped recess 17 into which the two sides of the U-shaped springs 16 are inserted. In addition, provision is made that the scraper blade holders 5 have latches 18 and the scraper blades 6 have recesses 19 or vice versa whereby the scraper blades 6 can be locked in an inserted or attached position. The scraper blades 6 can be fashioned as steel blades with a scraper edge of oxide ceramics 20. According to a modified enbodiment which is not shown in the drawing, the scraper edge of oxide ceramics 20 can rest on a step in the scraper blade 6 and/or can have at least two point-like elevations or recesses such as springs or grooves running in a longitudinal direction which fit into corresponding recesses or projections in the scraper blade 6. Thereby, a mechanically locking connection between the scraper edge 20 and the scraper blade 6 is achieved which is suitable for the absorption of shearing forces. It is thereby prevented that the scraper edge can loosen itself under extremes of vibrations and temperatures.

While specific embodiments of the invention have been shown and described in detail to illustrate the application of the principles of the invention, it will be understood that the invention may be embodied otherwise without departing from such principles.

What is claimed is:

1. A scraper device for a conveyor having an upper and a lower reach, comprising a bearing axle adapted to be supported below the lower reach, a blade holder having an intermediate resilient arm portion, said holder having a hub portion adjacent one end of said resilient arm portion engageable with said bearing axle and a blade holder member adjacent the opposite end of said resilient arm portion said blade holder member and disposed in a substantially vertically extending orientation, said blade being held against said lower reach at an angle of no more than 10° from a perpendicular to said lower reach, said resilient arm portion comprising spaced apart substantially parallel rods of resilient material, said resilient intermediate arms portion comprising upper and lower chords formed of spring steel rods, said blade holder member comprising a single part having said steel rods embedded therein.

2. A scraper device according to claim 1, wherein said intermediate resilient arm portion comprises a single upper chord and a single lower chord substantially parallel to said upper chord and wherein said blade holder member connects said chords together and holds said blade in a substantially vertical position.

3. A scraper device according to claim 1, wherein said intermediate resilient arm portion includes an upper chord and a lower chord which are of differing lengths.

4. A scraper device for a conveyor having an upper and a lower reach, comprising a bearing axle adapted to be supported below the lower reach, a blade holder having an intermediate resilient arm portion, said holder having a hub portion adjacent one end of said resilient arm portion engageable with said bearing axle and a blade holder member adjacent the opposite end of said resilient arm portion, a blade engaged in said blade holder member and disposed in a substantially vertically extending orientation, said blade being held against said lower reach at an angle of no more than 10° from a perpendicular to said lower reach, said resilient intermediate arm portion comprising spaced apart substantially parallel rods of resilient material, said resilient intermediate arm portion and said hub portion have reinforcement inlays and an attenuation zone in areas subject to critical stress.

* * * * *